United States Patent [19]

Ratner

[11] 4,311,221
[45] Jan. 19, 1982

[54] BRAKE BAND END CONNECTION

[76] Inventor: Michael Ratner, 67-33 170th St., Flushing, N.Y. 11365

[21] Appl. No.: 79,088

[22] Filed: Sep. 26, 1979

[51] Int. Cl.³ .............................................. F16D 65/06
[52] U.S. Cl. ................................................... 188/259
[58] Field of Search ..................... 188/77 R, 249, 259; 192/107 T

[56] References Cited

U.S. PATENT DOCUMENTS 3,858,691  1/1975  Victory ................................ 188/259

Primary Examiner—Duane A. Reger
Attorney, Agent, or Firm—Curtis, Morris & Safford

[57] ABSTRACT

An end connection for a transmission brake band enabling the band to be inserted longitudinally into the space between the transmission brake band drum and the transmission housing to facilitate replacement of transmission brake bands without requiring disassembly of the transmission housing. The end connection comprises a modification and conversion of a popular and readily available brake band to adapt said brake band to an end connection configuration which permits ready insertion of the brake band as described above. As modified the end connection comprises an end plate welded to the brake band strap having a reverse bend segment in which is seated a bracket clip having a cutout which interlocks with the end plate and having an extending tang portion or pocket engageable with a load applying piston rod and strut to selectively tighten the brake band.

7 Claims, 10 Drawing Figures

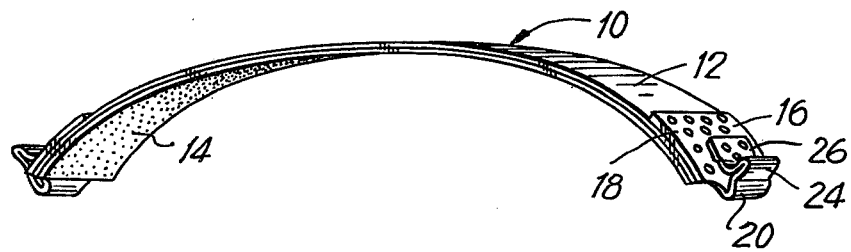
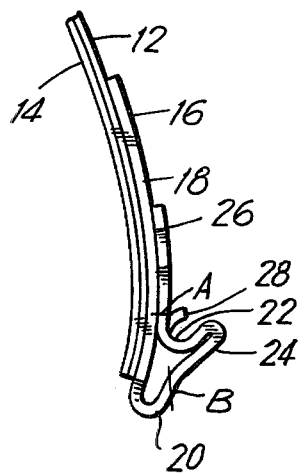
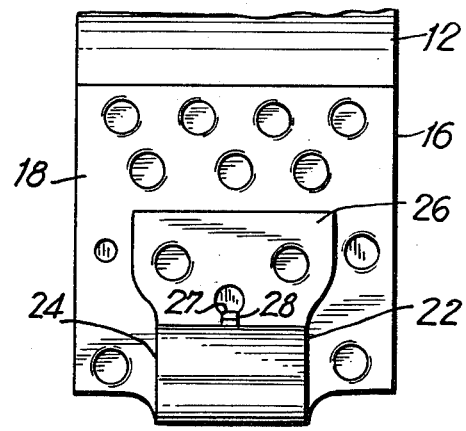
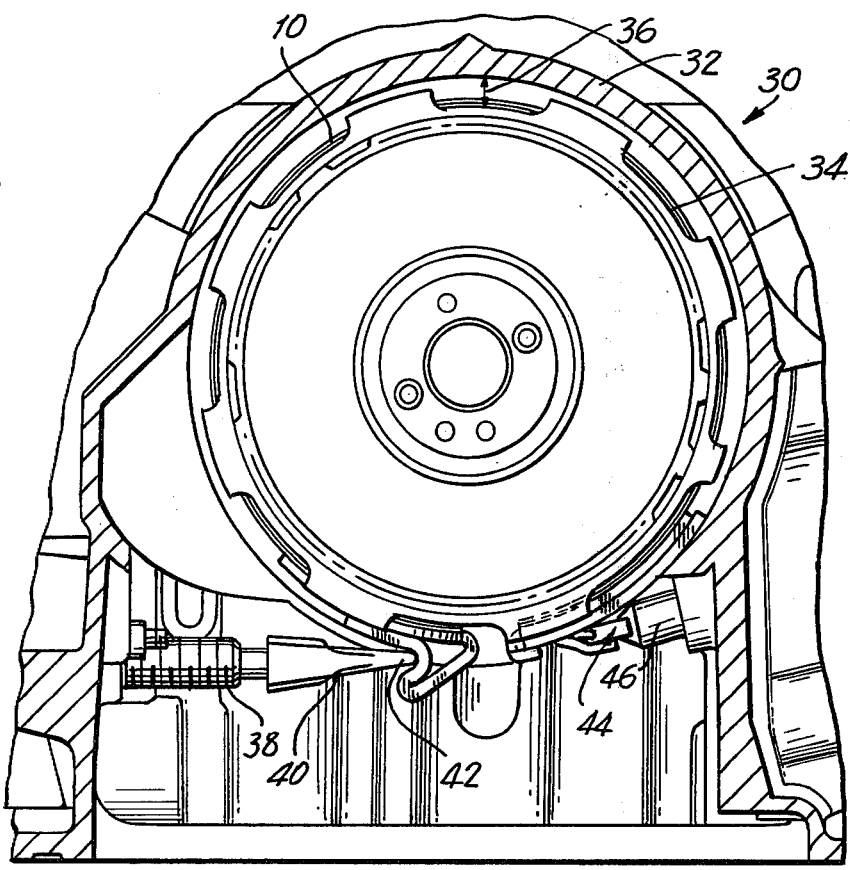

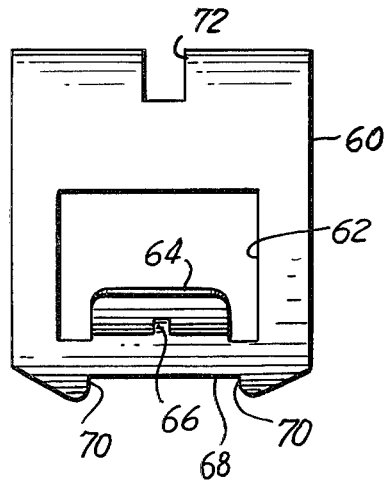
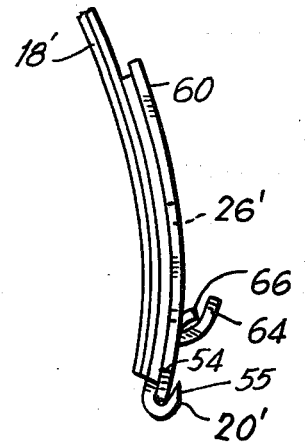
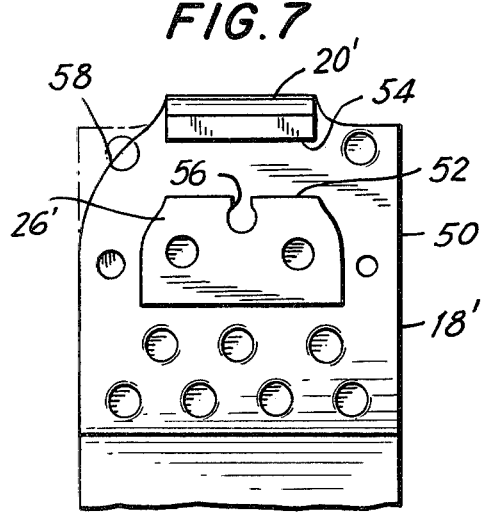
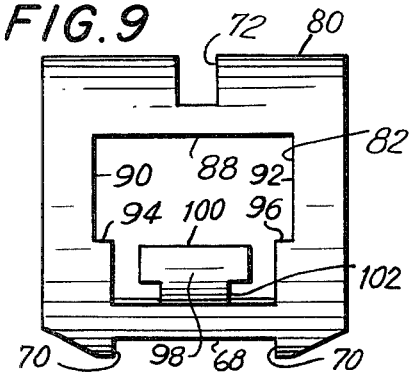
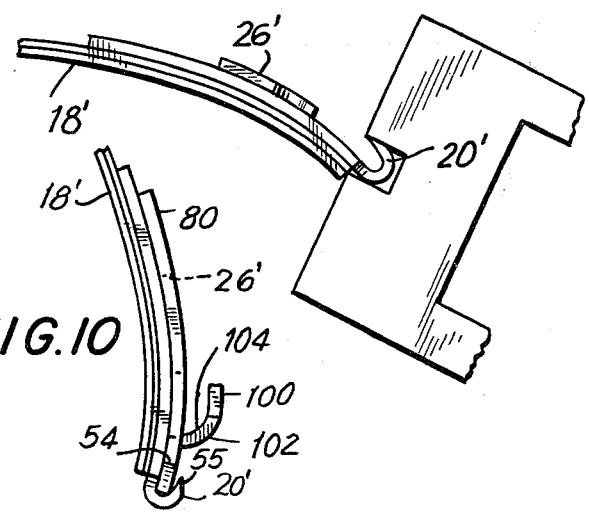
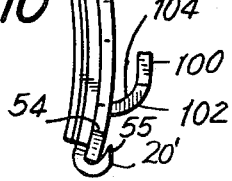

BRAKE BAND END CONNECTION

BACKGROUND OF THE INVENTION

1. Field of the Invention

The present invention relates to brake bands for automatic transmissions and, more particularly, to such brake bands fabricated from a flexible and resilient metal strap having a friction material bonded thereto intended to be used as a replacement brake band in automobile automatic transmissions which are being repaired.

Typically, in automobile automatic transmissions when a brake band breaks or develops slippage problems replacement of the transmission brake band is necessary. Such replacement must ordinarily be made by first removing and disassembling the transmission because in most instances there is a narrow space between the transmission housing and drum which normally precludes the insertion of a replacement brake band without disassembly of the transmission housing. Such a procedure is, of course, time consuming and results in high labor cost making such transmission repairs inordinately expensive.

2. Description of the Prior Art

Brake end connections for the same general purpose are shown in U.S. Pat. Nos. 1,528,957, Re. 16,028 and 1,562,867. However, constructions shown in these patents have certain drawbacks in terms of cost of manufacture and operability. Other patents, for example, U.S. Pat. Nos. 1,395,670, 1,500,341, 1,520,154, 1,787,376, 2,692,663, 3,367,466 and 3,543,181 also show brake band constructions which are generally pertinent as indicative of the types of brake bands proposed heretofore.

In addition it is noted that U.S. Pat. No. 3,399,749 to Baule discloses a popular type of brake band used as original equipment in many automotive transmission. U.S. Pat. Nos. 3,747,713 and 3,838,961 to Victory disclose a method and structure for converting the Baule type of brake band to an end connection which may be inserted in a transmission as a replacement brake band without requiring disassembly of the transmission housing. However, with the Victory type of modification to the Baule type brake band certain deleterious effects result.

First, the Victory patent states that the link has an oil blocking effect which has not been accounted for in the initial design of transmissions in which such brake bands are intended to be used. Thus, use of a Victory type end plate connection in a replacement brake band may offer a performance which is difficult than the original equipment brake band.

Secondly, pressure in the Victory type end plate connection is applied at a point more removed from the end of the brake band than the original equipment brake band of the Baule type. Brake bands of this type will cease to energize at the point where pressure is applied so that the use of the Victory type of end plate connection on a Baule type brake band will result in loss of braking effect on that portion of the band between the point of pressure application and the end plate.

In addition, the Victory proposed modification to the Baule type brake band requires the complete removal of a portion of the original brake band end connection which has been spot welded to the brake band. Such a removal requires use of machine tools which require some skill in use and necessarily makes the proposed modification more expensive.

BRIEF SUMMARY OF THE INVENTION

It is an object of the present invention to provide a new and improved transmission brake band end connection which enables the band to be replaced without requiring disassembly of the transmission housing.

It is a further object of the present invention to provide a new and improved transmission brake band end connection which can be utilized with readily available replacement brake bands to modify and connect such brake bands into ones which can be readily assembled and inserted in a transmission system at relatively modest cost and with relative ease.

A still further object of the present invention is to provide an end connection for a transmission brake band which closely duplicates the design and performance characteristics of original equipment transmission brake bands.

According to a preferred embodiment of the present invention these and other objects and advantages are achieved by providing a link member and a method of modifying a transmission brake band of the type supplied as original equipment. By predetermined simple machining operations one end of a popular type of brake band as is shown in the aforesaid Baule patent is modified to receive the connection link member of the present invention which seats by an interlocking connection into the modified end plate of the Baule type brake band to provide an end plate connection which closely approximates the performance characteristics of original equipment brake bands. The simple machining operation according to the present invention is two hand saw cuts which leaves the original spot-welded portion of the Baule type brake band intact. These two simple cuts can be readily made by the installer without requiring any modifications to be made by anymore complex machining operations.

BRIEF DESCRIPTION OF THE DRAWINGS

FIG. 1 is a perspective view of a typical brake band of the Baule type supplied as original equipment as a brake band in many automotive transmission systems;

FIG. 2 is an enlarged side view of the end plate connection of the brake band of FIG. 1;

FIG. 3 is a plan view of the end plate connection of FIG. 2;

FIG. 4 is a fragmentary cross-sectional view of a transmission housing showing a brake band according to the present invention as assembled in the transmission system;

FIG. 5 is a plan view of one embodiment of the link member of the brake band end connection of the present invention;

FIG. 6 is an elevational view of the link of FIG. 5 engaged on a brake band end plate;

FIG. 7 is a plan view of the end plate of a brake band as modified according to one embodiment of the present invention;

FIG. 8 is a side elevational view showing the step of gauging the extent of modification of a brake band end according to the present invention;

FIG. 9 is a plan view of another embodiment of the link member of the brake band end connection of the present invention; and FIG. 10 is an elevational view of the link of FIG. 9 engaged on a brake band end plate.

DESCRIPTION OF THE PREFERRED EMBODIMENTS

With reference to the drawings, and initially FIGS. 1 through 4, there is shown a brake band 10 of the popular type illustrated in Baule U.S. Pat. No. 3,399,749. This type of brake band comprises a flexible resilient metal strap 12 to which is bonded a friction lining 14 on one side thereof. Band 10 is provided at each end with end plates or connections generally indicated at 16. Each end connection 16 comprises a curved end plate 18 secured, for example by riveting, to strap 12. The curvature of plate 18 has a radius of curvature approximately equal to the radius of the brake drum on which the brake drum is intended to be used. Each end plate 18 has a first or outer reverse fold 20 and a second fold 22 with a sharply bent portion 24 forming the juncture between folds 20 and 22. An extension 26 from fold 22 is spot-welded in overlapping relationship to plate 18. Fold 24 serves as a seat or pocket for a retaining strut when the brake band is assembled in a transmission and the fold 20 serves to reinforce the strut seat. At the center of the seat formed by fold 22 is an extending tongue segment 28 formed from a cutout portion of the extension plate 26, defined by slot 27. Tongue 28 is bent upwardly to serve as a locating and positioning lug for the reception of the connecting strut, as will be described more fully hereinbelow.

Reference is now made particularly to FIG. 4 where an automatic transmission assembly is indicated generally at 30 and is shown to include a substantially circular housing member 32 spaced from and surrounding a brake drum 34. The radial space between the drum and the housing is indicated by the double-ended arrow 36. Mounted within the housing 32 is an adjustable backup screw 38 provided with a brake band contact strut 40 having a bifurcated end portion 42 for location within pocket 22 of a brake band end strut about location tongue 28.

As shown, the brake band 10 is positioned about the brake drum 34 with its opposite free end engaged by an extending connecting strut 44 of a selectively operable piston member 46. Thus by extending the piston member 46 brake band 10 is brought into frictional engagement with the brake drum 34 and upon retraction of piston member 46 frictional contact between the brake band and the brake band drum is removed. The strut 44 as shown is the same strut used with an original equipment Baule type brake band to maintain the original design components as much as possible. Use of the same strut is another difference between the present invention and that shown in the Victory patents as the Victory design does away with the original equipment strut entirely.

As indicated in FIG. 4, the radial space 36 between the housing 32 and the brake drum 34 is significantly less than the width of the end plate 18 of the brake band 10. Thus to replace a brake band 10 of the Baule type, when such replacement becomes necessary, the transmission housing 32 must be completely dismantled to provide sufficient clearance around brake drum 34 to install a new brake band.

According to one aspect of the present invention a method of modifying one end of a brake band of the Baule type is provided such that the brake band can be inserted into a transmission system without requiring complete disassembly of the transmission housing. An interlocking link member is also provided which cooperatively mates with the modified end of the Baule type brake band to complete the assembly of the brake band within a transmission system so that the modified replacement brake band functions in substantially the same manner as the original equipment brake band it replaces.

With reference to FIGS. 5 through 8 and initially FIG. 7, it is seen that one end 50 of a Baule type transmission brake band, as shown in FIG. 3, is modified by machining out portions of the double folded end plate 18. Specifically, a straight cut, as indicated at 52, is made in that portion of the extension 26 at the approximate position indicated at A in FIG. 2 and another straight cut, indicated at 54 and also at B in FIG. 2, is made in the bent portion 24 forming the junction between folds 22 and 20. By making these two cuts, 52 and 54, the intermediate portion of end plate 18 may be removed leaving an end plate configuration as shown in FIGS. 7 and 8 with a shortened extension member, indicated at 26', bonded to the end plate by spot-welding and a single reverse fold 20' defining a seat or pocket at the terminal portion of end plate 16'. The end plate configuration which remains also includes a portion of the slot 27 and shown at 56 in the extension plate 26'. One or both ends may also be machined as at 58 to provide a rounded corner facilitating insertion of the brake band end into the transmission housing.

A link plate member 60 (see FIGS. 5 and 6) is also provided for interlocking engagement with the modified end plate 18' of the brake band. Link plate 60 is a substantially curved plate member, having a radius of curvature closely approximating the radius of the brake band end plate and of the brake drum on which the brake band is to be used so that link plate 60 will fit in closely abutting relationship on end plate 18'.

Link plate 60 includes a substantially rectangular cutout segment 62 with an upwardly and inwardly bent tang 64 formed on the lower side of opening 62, as viewed in FIG. 5. Tang 64 also includes a smaller extending tongue member 66 formed by cutting a segment of tang 64 about three sides and bending the formed tongue inwardly so that the tongue protrudes along the inwardly facing bend of tang 64 as more clearly illustrated in FIG. 6.

The lower portion of link 60 also includes a central cutout segment 68 defined by shoulders 70 for mating interlocking engagement within the pocket 20' of end plate 18' so that shoulders 70 straddle the lateral side walls defining pocket 20'.

Cutout 62 is formed to provide clearance for the shortened extension plate 26' so that when link 60 is in mating interlocking engagement with end plate 18', the shortened extension plate 26' fits within the opening formed by cutout 62. When link 60 is engaged on end plate 18' the cutout portion has an edge surface positioned close to the lower edge portion of shortened extension plate 26' to preclude relative upward sliding movement of the link 60 with respect to end plate 18'.

The upper end of link 60, as viewed in FIG. 5, is provided with a gauging slot 72 having a depth and width selected so that the slot 72 may be used as a gauging tool. As shown in FIG. 8, in order to determine the amount of material to be removed, a material cut 55 is made to enable the band end to pass through space 36, for example by hand grinding.

Reference is now made to FIGS. 9 and 10 showing an alternate embodiment 80 of the link plate member of the present invention. In this embodiment, link plate 80 is similar to link plate 60 in its basic configuration in that it is a substantially curved plate member, having a radius of curvature closely approximating the radius of the brake band end plate and of the brake drum on which the brake band is to be used.

Link plate 80 includes a cutout segment 82 which includes a first substantially rectangular segment 84 and a second smaller rectangular segment 86 adjacent to rectangular segment 84 to form a substantially open T-shaped cutout. Rectangular segment 84 is defined by a lateral wall 88, longitudinal walls 90 and 92 and partial lateral wall segments 94 and 96.

In forming second rectangular cutout segment 86 sufficient material is left to form a substantially T-shaped tang member 98 having a wider upper segment 100 and a lower segment 102. Lower segment 102 is bent (see FIG. 10) so that segment 100 is positioned substantially parallel to the surface of link plate 80 to define a receiving pocket 104 to receive and retain piston connecting strut 44. The larger extent of upper segment 100 precludes lateral displacement of connecting strut 44.

Cutout segment 84 is dimensioned so that lateral wall 88 and wall segments 94 and 96 fit in close clearance about end plate extension member 26′ to preclude movement of link plate 80 with respect to the brake band end plate once link plate 80 has been put into place.

Link plate 80 also includes a gauge slot 72 for use in determining where machine cut 54 is to be made and is formed with a cutout segment 68 and shoulders 70 as described above with respect to link plate 60.

When it becomes necessary to replace a brake band in an automotive transmission system the procedure entails draining oil from the transmission housing, removing the oil pan and valve body to expose the lower portion of the transmission, as viewed in FIG. 4, to allow removal of a broken or slipping brake band. To replace a band that is not broken one band end is pulled downwardly and severed so that the band can then be removed from the transmission housing. The end 18′ of a modified Baule brake band is then inserted, in the clockwise direction as viewed in FIG. 4, until the modified end reaches the open clearance where a link 60 or 80 is inserted and interlockingly engaged and strut 40 and connecting strut 44 of piston rod 46 are appropriately connected.

With the replacement band in place it is noted that piston connecting strut 44 engages the link plate in the vicinity of the pocket which is in a position closely approximating the contact point of the piston rod with an original equipment Baule type brake band so that the friction surface 14 of the brake band is used along the full design extent of its surface.

What is claimed is:

1. A brake band end connection enabling the band to be inserted between a transmission housing and a brake drum without disassembly of the transmission housing and to be engageable by a selectively reciprocating force applying member associated with said housing comprising, a first end plate member secured to one end of a brake band element, said first end plate member being a curved plate member having a radius of curvature approximately the same as the radius of the brake drum on which said brake band is to be used, said first end plate including a reverse bend segment at its free end thereof defining a receiving pocket, a second end plate member bonded to said first end plate member having a significantly lesser circumferential extent and positioned inwardly from the said reverse bend segment, said second end plate member including engaging means formed therein along a surface of said second end plate member facing said reverse bend segment, a curved link member having one end receivable in said receiving pocket defined by said reverse bend segment, said link member having a radius of curvature approximately equal to the radius of curvature of said first end plate member and means on said link plate member for interlocking engagement with said engaging means and with said first end plate member to preclude lateral and longitudinal relative sliding movement between said link member and said first end plate member when said link member is operatively engaged on said first end plate member, and an extending tang segment formed on said link member for engagement with said force applying member thereby to activate said brake band into braking engagement with said brake drum upon selective actuation of said force applying member.

2. A brake band end connection as defined in claim 1 wherein said engaging means on said second end plate member comprises a slot formed thereon and wherein said link member includes an extending tongue having a portion thereof adapted to be received within said slot when said link member is in operative engagement on said first end plate member.

3. A brake band end connection as defined in claim 1 wherein said link member includes a cutout portion thereof defining an opening in said link member to receive said second end plate member therein when said link member is in operative engagement on said first end plate member.

4. A brake band end connection as defined in claim 3 wherein said tang segment is formed to extend from one surface of a wall defining said link member cutout portion, said tang being upwardly and inwardly bent with respect to the outside radius of curvature of said link member to define a receiving pocket for an element of said force applying member.

5. A brake band end connection as defined in claim 1 wherein said engaging means further includes a cutout portion formed in one end of said link member, said cutout portion including opposite shoulder segments and wherein said shoulder segments closely straddle the exterior wall surface defining said reverse bend segment when said link member is in operative engagement on said first end plate thereby to locate and fix the relative position of said link member on said first end plate member.

6. A link member for use in assembly of a brake band in a transmission which has had one end thereof modified to permit insertion of said modified brake band end in a transmission housing between the housing and a brake drum therein without requiring complete disassembly of the housing comprising, a curved plate member having a radius of curvature substantially equal to the radius of a brake drum on which said brake band is to be used, said curved plate member including a cutout segment along the midportion thereof, an extending tang formed along one surface defining said cutout segment, said tang being formed to extend upwardly from the outside curved surface of said plate member and then generally more inwardly to define a pocket to receive an element of a reciprocating force applying member and said link member including a cutout defined by opposed shoulder segments formed in an end surface of said plate member adjacent said tang to locate and position said link member on a brake band end plate.

7. A link member as defined in claim 6 including a gauge slot formed in an end surface of said plate member opposite the end surface having said cutout.

* * * * *